(12) United States Patent
Chan (10) Patent No.: US 7,843,786 B2
(45) Date of Patent: Nov. 30, 2010

(54) DISCRIMINATION METHOD OF OPTICAL STORAGE MEDIUM

(76) Inventor: Yi-Chung Chan, c/o 8F, No. 533, Chung-Cheng Rd., Hsin-Tien City, Taipei Hsien (TW)

( * ) Notice: Subject to any disclaimer, the term of this patent is extended or adjusted under 35 U.S.C. 154(b) by 878 days.

(21) Appl. No.: 10/693,052

(22) Filed: Oct. 23, 2003

(65) Prior Publication Data

US 2004/0081049 A1   Apr. 29, 2004

(30) Foreign Application Priority Data

Oct. 24, 2002   (TW) .............................. 91124661 A (51) Int. Cl.
*G11B 7/00*   (2006.01)
(52) U.S. Cl. ................. 369/53.23; 369/53.2; 369/53.22; 369/53.37
(58) Field of Classification Search .............. 369/59.19, 369/53.2–53.23, 53.37
See application file for complete search history.

(56) References Cited

U.S. PATENT DOCUMENTS

| 5,003,521 | A |   | 3/1991 | Yoshida et al. | |
| 5,381,392 | A | * | 1/1995 | Hira | 369/53.23 |
| 5,506,824 | A |   | 4/1996 | Fairchild et al. | |
| 5,724,325 | A |   | 3/1998 | Jeong | 369/44.27 |
| 5,745,460 | A | * | 4/1998 | Tateishi | 369/53.22 |
| 5,764,610 | A | * | 6/1998 | Yoshida et al. | 369/53.22 |
| 5,831,952 | A | * | 11/1998 | Yamada et al. | 369/53.22 |
| 5,903,531 | A |   | 5/1999 | Satoh et al. | |
| 5,917,791 | A |   | 6/1999 | Tsuchiya et al. | |
| 5,959,955 | A | * | 9/1999 | Choi | 369/53.23 |
| 6,005,832 | A | * | 12/1999 | Kumagai | 369/44.27 |
| 6,052,344 | A |   | 4/2000 | Ueki | |
| 6,212,141 | B1 |   | 4/2001 | Tanikawa et al. | |
| 6,249,499 | B1 | * | 6/2001 | Andoh | 369/53.22 |
| 6,295,260 | B1 |   | 9/2001 | Shihara et al. | |
| 6,304,535 | B1 |   | 10/2001 | Magome et al. | |

(Continued)

FOREIGN PATENT DOCUMENTS

BR   PI0418819 A   11/2007

(Continued)

OTHER PUBLICATIONS

Search and Examination Report for GB Application No. 0324645.1, Mail Date Nov. 22, 2004, 8 pages.

(Continued)

*Primary Examiner*—Wayne R Young
*Assistant Examiner*—Latanya Bibbins
(74) *Attorney, Agent, or Firm*—Perkins Coie LLP (57) ABSTRACT

A method for discriminating an optical storage medium is disclosed. A predetermined range of the optical storage medium is read after the light source is focused on; and thereby a plurality of data transition points and transition regions defined by an interval of two neighboring points are obtained. Thereafter, the time-consumption for reading the longest transition region is used to determine the type of the currently accessed optical storage medium. Another physical characteristics according to data storage formats, such as the PLL clock frequency or the distance between the reflection layer and the surface layer of the optical storage medium, may be used as references to discriminate the currently accessed optical storage medium.

17 Claims, 5 Drawing Sheets

U.S. PATENT DOCUMENTS

| | | | |
|---|---|---|---|
| 6,449,232 B1 | 9/2002 | Kuwahara et al. | 369/53.23 |
| 6,459,666 B1 | 10/2002 | Yokoi | |
| 6,603,720 B1 | 8/2003 | Kuroda et al. | |
| 6,700,847 B2 | 3/2004 | Osada | |
| 6,728,181 B2 | 4/2004 | Shimoda et al. | |
| 6,747,931 B1 | 6/2004 | Park et al. | |
| 6,760,289 B1 | 7/2004 | Ide | |
| 6,807,136 B1* | 10/2004 | Grimm | 369/53.41 |
| 6,816,443 B1 | 11/2004 | Hwang et al. | |
| 6,822,936 B2 | 11/2004 | Ono et al. | |
| 6,856,586 B2 | 2/2005 | Usui et al. | |
| 6,868,051 B2 | 3/2005 | Ogihara | |
| 6,909,678 B2* | 6/2005 | Morishima | 369/47.3 |
| 6,925,039 B2* | 8/2005 | Yanagawa et al. | 369/44.32 |
| 6,980,500 B2 | 12/2005 | Lu et al. | |
| 6,992,961 B2 | 1/2006 | Minase et al. | |
| 7,016,284 B2 | 3/2006 | Chou | |
| 7,046,593 B2 | 5/2006 | Ito | |
| 7,099,253 B2 | 8/2006 | Hsu et al. | |
| 7,136,340 B2 | 11/2006 | Ide et al. | |
| 7,570,561 B2 | 8/2009 | Tai | |
| 7,602,684 B2 | 10/2009 | Chen et al. | |
| 7,626,907 B2 | 12/2009 | Chang et al. | |
| 2002/0015017 A1 | 2/2002 | Kwag | |
| 2002/0075780 A1 | 6/2002 | Ogihara | |
| 2002/0105895 A1 | 8/2002 | Tanaka | |
| 2002/0126607 A1* | 9/2002 | Yamamoto et al. | 369/53.22 |
| 2002/0150017 A1 | 10/2002 | Ono et al. | |
| 2003/0099171 A1 | 5/2003 | Ito | |
| 2003/0103428 A1 | 6/2003 | Lu et al. | |
| 2004/0090883 A1 | 5/2004 | Lee et al. | |
| 2004/0090895 A1 | 5/2004 | Lee et al. | |
| 2004/0130986 A1 | 7/2004 | Minase et al. | |
| 2004/0218497 A1 | 11/2004 | Choi et al. | |
| 2005/0047300 A1 | 3/2005 | Ono et al. | |
| 2005/0058036 A1 | 3/2005 | Chen et al. | |
| 2005/0105433 A1 | 5/2005 | Juan et al. | |
| 2005/0226114 A1 | 10/2005 | Liow et al. | |
| 2005/0265188 A1 | 12/2005 | Chang et al. | |
| 2005/0265189 A1 | 12/2005 | Tai | |
| 2006/0198268 A1 | 9/2006 | Chan | |
| 2009/0103402 A1 | 4/2009 | Liow et al. | |

FOREIGN PATENT DOCUMENTS

| | | |
|---|---|---|
| BR | PI0418821 A | 11/2007 |
| CN | 1348181 | 5/2002 |
| CN | 1366660 | 8/2002 |
| CN | 1490790 | 4/2004 |
| CN | 1591643 A | 3/2005 |
| CN | 1601639 | 3/2005 |
| CN | 1637909 | 7/2005 |
| CN | 1658312 A | 8/2005 |
| CN | 1700311 | 11/2005 |
| DE | 10349161 A1 | 6/2004 |
| EP | 0725395 | 11/1996 |
| EP | 0784321 A2 | 1/1997 |
| EP | 0784321 | 7/1997 |
| EP | 0813192 | 12/1997 |
| EP | 0811971 | 4/1998 |
| EP | 0903735 | 3/1999 |
| GB | 2394596 | 4/2004 |
| JP | 10302381 | 11/1998 |
| JP | 2000078392 | 3/2000 |
| JP | 2000315355 A | 11/2000 |
| JP | 2000322742 | 11/2000 |
| JP | 2001-126376 | 5/2001 |
| JP | 2001-167510 | 6/2001 |
| JP | 2001265620 | 9/2001 |
| JP | 2002007156 | 1/2002 |
| JP | 2002119830 A | 4/2002 |
| JP | 2002312933 A | 10/2002 |
| JP | 2003016441 A | 1/2003 |
| JP | 2003078392 | 3/2003 |
| JP | 2003217135 | 7/2003 |
| TW | 200511273 | 3/2003 |
| TW | 200539114 | 12/2005 |
| TW | 200539115 | 12/2005 |
| TW | 253060 | 4/2006 |
| TW | I298156 | 8/2008 |
| WO | WO-03005350 A1 | 1/2003 |
| WO | WO-2005117008 A1 | 12/2005 |
| WO | WO-2005117009 A1 | 12/2005 |

OTHER PUBLICATIONS

Search and Examination Report for GB Application No. 0324645.1, Mail Date Feb. 9, 2004, 1 page.

German Search Report for German Application No. 10349161.9, Mail Date Nov. 17, 2004, 4 pages.

International Publication with Search Report for PCT Application No. PCT/CN2004/001531; Applicant: Via Technologies, Inc.; Date of Mailing: Mar. 31, 2005; 19 pages.

Written Opinion for Application No. PCT/CN2004/001531; Applicant: Via Technologies, Inc.; Date of Mailing: Apr. 7, 2005; 4 pages.

International Preliminary Examination Report on Patentability for PCT Application No. PCT/CN2004/001531; Applicant: Via Technologies, Inc.; Date of Issuance: Nov. 29, 2006; 5 pages.

International Publication with Search Report for PCT Application No. PCT/CN2004/001409; Applicant: Via Technologies, Inc.; Date of Mailing: Mar. 10, 2005; 21 pages.

Written Opinion for Application No. PCT/CN2004/001409; Applicant: Via Technologies, Inc.; Date of Mailing: Mar. 10, 2005; 4 pages.

International Preliminary Examination Report on Patentability for PCT Application No. PCT/CN2004/001409; Applicant: Via Technologies, Inc.; Date of Issuance: Nov. 29, 2006; 5 pages.

First Office Action for TW Patent Application No. 93127819; Issued by the Taiwan Intellectual Property Office on Jun. 24, 2008; 7 pages [summary attached].

Second Office Action for TW Patent Application No. 93127819; Issued by the Taiwan Intellectual Property Office on Feb. 18, 2009; 6 pages [summary attached].

Fourth Office Action for TW Patent Application No. 93127819; Issued by the Taiwan Intellectual Property Office on Nov. 11, 2009; 6 pages [translation attached].

First Office Action for TW Patent Application No. 91310202; Issued by the Taiwan Intellectual Property Office on Mar. 21, 2008; 5 pages [summary attached].

* cited by examiner

DISCRIMINATION METHOD OF OPTICAL STORAGE MEDIUM

CROSS-REFERENCE TO RELATED APPLICATION

This application claims the priority benefit of Taiwan application serial no. 91124661, filed on Oct. 24, 2002.

BACKGROUND OF THE INVENTION

1. Field of the Invention

The invention relates in general to a discrimination method of an optical storage medium, and more particularly, to a method of discriminating the data storage format of the optical storage medium, according to the physical characteristics of various data storage formats thereof.

2. Related Art of the Invention

The optical storage media have been continuously retrofitted by versatile developments of related technologies. Nowadays, digital versatile disks (DVD) and compact disks (CD) are the two major types of optical storage media, which have been mass-produced and broadly for sale on the market. Many manufacturers devote their efforts to develop their optical pickup head with capability of reading data from both types of the optical storage media aforementioned. However, since these two types of optical storage media have different physical characteristics and data storage formats, any optical device essentially has the capable of discriminating the type of the currently loaded optical storage medium.

For example, an optical disk system (e.g. DVD-ROM drive or DVD-ROM/CDRW (i.e. Combo) drive) may assume the optical storage medium that its pickup head currently accessed is a DVD and use the parameters required for reading a DVD to drive its pickup head for reproducing data. Once the data cannot be reproduced under such an assumption, the optical pickup head is reset and loads associated parameters for reading a CD before driving the pickup head for reproducing data again. However, since the operations including light source turning on, lens focusing and tracking, must be performed before accessing data for confirming the assumption, time-cost is arisen for re-performing the aforementioned operations if the assumption is incorrect. Time-consumption that the optical pickup head discriminates the type of the optical storage medium may vary seriously and very difficult to control, customers may confuse that with system damage or malfunction.

SUMMARY OF THE INVENTION

The present invention provides a discrimination method of an optical storage medium, which quickly and correctly discriminates the type of the currently loaded optical storage medium according to the physical characteristics of the corresponding data storage format thereof.

The present invention further provides a discrimination method of an optical storage medium that reads a predetermined range of an optical storage medium and obtains a lot of data transition points after the light source is focused on. Thereafter, the transition region that has the longest maintained period defined by two neighboring data transition points is selected so as to determine the type of the optical storage medium.

In one embodiment of the present invention, the time-consumption for reading the longest data transition region is used as a reference for determining the type of the currently loaded optical storage medium. Under the same rotation speed, an optical storage medium is determined as a CD when the time-consumption for reading the longest transition region is longer than a time threshold. In contrast, the optical storage medium is determined as a DVD if the time-consumption for reading the longest transition region is shorter than the time threshold.

In another embodiment of the present invention, the PLL clock frequency applied for reproducing data is used as a reference for discriminating the optical storage media. Under the same rotation speed, when the clock frequency used for reading data at the same location is smaller than a frequency threshold, the optical storage medium is determined as a CD. On the contrary, the currently accessed optical storage medium is determined as a DVD if the PLL clock frequency is larger than the frequency threshold.

In a still further embodiment, the distance between the reflection and surface layers is employed to accelerate the discrimination process since the reflection layer of a DVD is substantially at an intermediate position between the upper lower surface layers of the DVD, while the reflection layer of a CD is located underneath the surface layer more distant from the light source. Accordingly, based on the physical characteristics for each specific data storage format of the optical storage medium such as the longest transition region between the data transition points and the clock frequency applied for reproducing data, the type of optical storage medium may be determined easily. The CDs and DVDs may be distinguished by using the methods of the embodiments since their physical characteristics and storage formats are very different to each other.

BRIEF DESCRIPTION OF THE DRAWINGS

These, as well as other features of the present invention, will become more apparent upon reference to the drawings.

DETAILED DESCRIPTION OF THE PREFERRED EMBODIMENT

Figure 1:
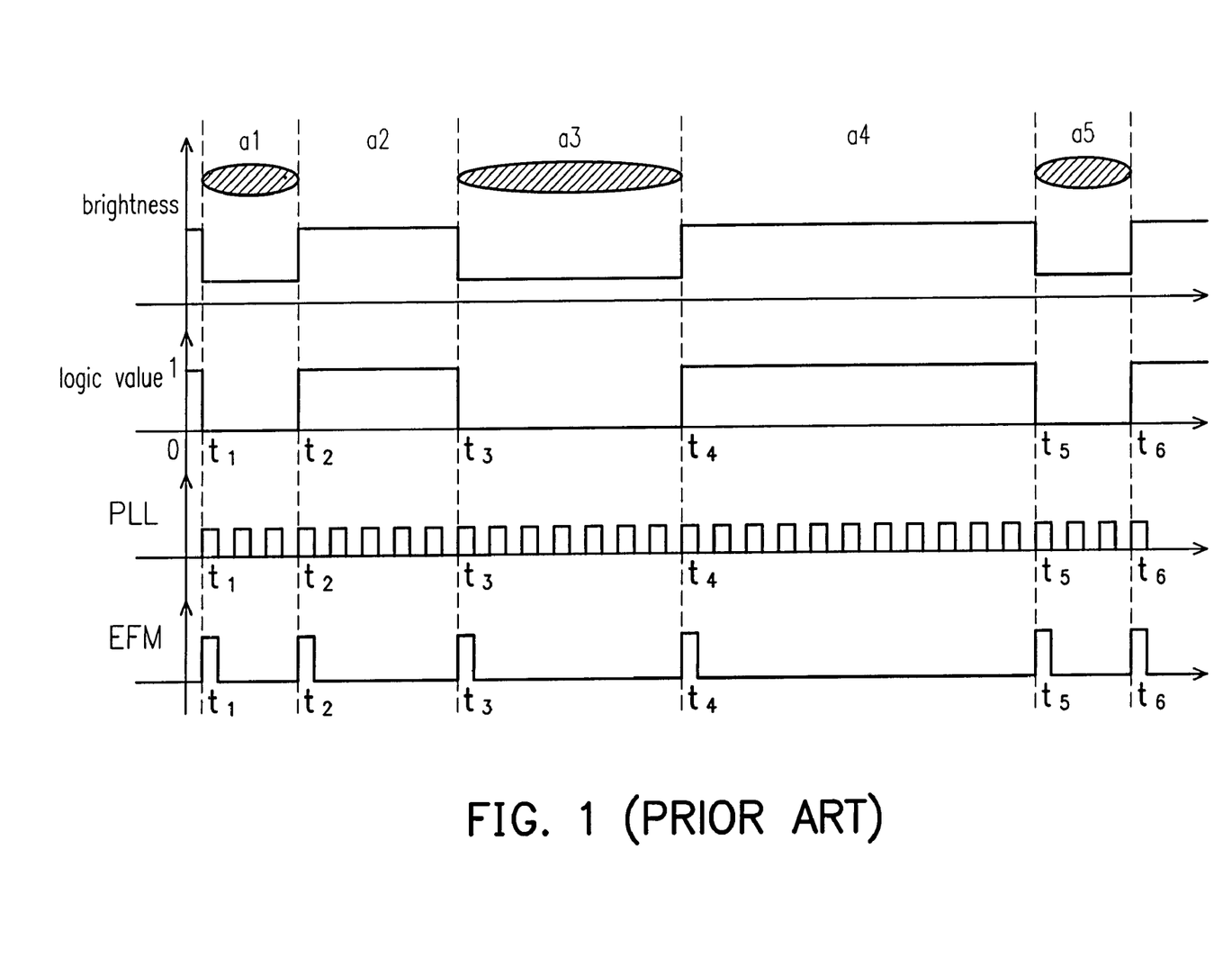
FIG. 1 shows a waveform diagram illustrative of the data storage format when reproducing data from a compact disk.

To allow one of ordinary skill in the art to easily understand the spirit of the present invention, the data storage format and the reproducing method of an optical storage medium are illustrated as follows. FIG. 1 shows the waveform diagram illustrative of the data storage format when reproducing data from a CD. As known by the skilled in the art, any data should pass an eight-to-fourteen modulation (EFM) before recorded on the CD. Tracks composed of pits denoted by a1, a3 and a5 and lands denoted by a2 and a4 in FIG. 1 are formed on the CD. While accessing data from a CD, the operations such as turning on light source, rotating the CD, lens focusing and tracking, are performed before reading data from the tracks.

While reproducing data, the light source is incident on the tracks and reflected to the pickup head. Relative to the lands, the pits include recessed grooves. The brightness of the reflected light at various positions is shown as FIG. 1 wherein the brightness of the pits are lower than that of the lands. The brightness obtained by the pickup head is then digitized into corresponding logic values. Waveforms of these logic values may be read by referring a frequency-adjustable PLL clock, and then transformed into digital data based on EFM coding specification.

As shown in FIG. 1, the logic values convert at time t1, t2, t3, t4, t5 and t6. In the following description of the specification, a data transition point is defined as the moment when conversion occurs, while a transition region refers to an interval between two neighboring data transition points. According to the rule of the EFM specification, the length of each transition region should be constrained between three to eleven periods (3T to 11T) of the PLL clocks. Furthermore, the data transition point indicates logic 1 and the rest (i.e. the non-transition points) indicates logic 0 as the definitions of the EFM specification. Obviously, the EFM value depicted in FIG. 1 is 1001000010000001000000001001 with transition region lengths 3, 5, 7, 11 and 3 from left to right.

The DVD employs a coding approach similar to that of the CD except that the CD uses eight-to-fourteen modulation while the DVD uses eight-to-sixteen modulation. Furthermore, each transition region corresponding to DVD specification must be restricted between three and fourteen periods (3T to 14T) of the PLL clocks. Therefore, the dimension differences between the longest transition regions of the CD and DVD are arisen from both of the differences in data storage format and that in data accessing speeds under the same rotation speed. Generally, the longest transition region (eleven PLL periods, 11T) for the CD is about 3.341 microns while the longest transition region (fourteen PLL periods, 14T) for DVD is about 1.867 microns. The embodiment employs the differences of the physical characteristics in data storage formats, such as the longest transition region, the time-consumption for reading and the frequency of the clock PLL, as references to discriminate the currently loaded optical storage medium.

Figure 2:
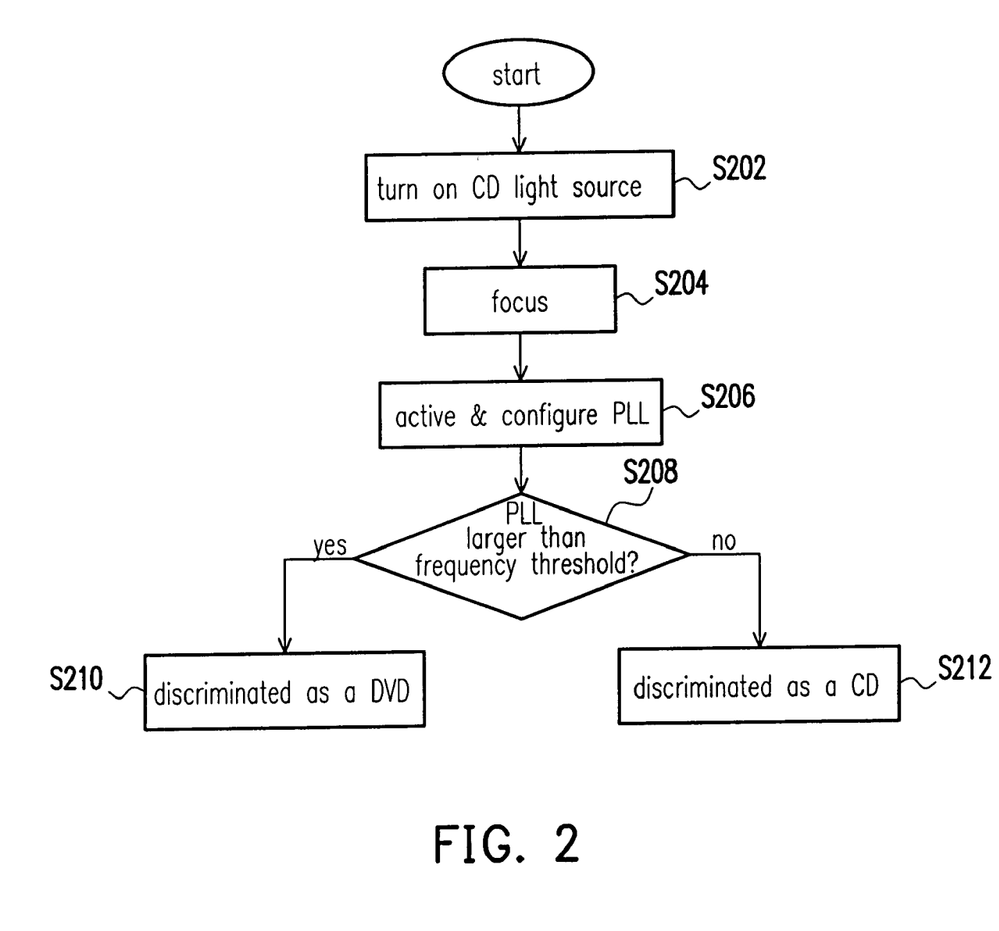
FIG. 2 shows the process flow in one embodiment of the present invention.

FIG. 2 shows a flow illustrative of the operating procedure in one embodiment of the present invention. Please note that the light source used for accessing data from the CD may also be used to focus on the DVD. Conversely, the light source for accessing the DVD can only be used to focus on the DVD instead of both. Therefore, the embodiment may operate the light source used for accessing CD now, however, the present invention may employ light sources used for accessing both of DVD and CD if technology developments make such kind of light source being designed in the future.

In the embodiment as shown in FIG. 2, the CD light source is firstly turned on to project light beam on the optical storage medium before focusing operation (step S202). After the focusing step, the optical pickup head accesses data in a predetermined range of the optical storage medium to achieve the objective that configures the PLL clock frequency used for reading the data (step 204).

Generally speaking, the most front section of each data frame contains a lot of synchronous data providing for achieving the purposes of configuring the PLL clock frequency and others. These synchronous data include several longest transition regions conforming to the currently used data storage format. For example, the synchronous data encompasses several longest transition regions partitioned into eleven parts (i.e. 11T) by the PLL clocks under the CD format. Similarly, the longest transition regions contained synchronous data being partitioned into fourteen equivalent parts (i.e. 14T) by PLL clocks under the DVD format. Therefore, the longest transition region may be accessed correctly by means of the accessing operations to the synchronous data in each data frame so that the PLL clock frequency may be configured according to currently used rotation speed.

After the clock PLL is activated and configured already, the configured PLL clock frequency is compared to a frequency threshold to realize the type of the optical storage medium accessed by the optical pickup head (step S206). Assume that the CD light source is used to read the innermost part of the optical storage medium under a fixed rotation speed 2400 rpm and the optical storage medium is a CD, then the PLL clock frequency is:

$$4.3218 \text{ MHz} \times \frac{2400 \ rpm}{500 \ rpm} = 20.74 \text{ MHz} \tag{1}$$

where 4.3218 MHz is the PLL clock frequency used for reading CD data under the standard speed (i.e. 1×), and 500 rpm is the rotation speed for reading data in the inner part of CD under 1×.

Under the above conditions, if the optical storage medium is a DVD, the PLL clock frequency is:

$$26.16 \text{ MHz} \times \frac{2400 \ rpm}{1389 \ rpm} \times \frac{11T}{14T} = 35.56 \text{ MHz}, \tag{2}$$

where 26.16 MHz is the PLL clock frequency for reading DVD data under the standard speed (i.e. 1×), and 1389 rpm is the rotation speed for reading data in the inner part of the DVD under 1×. If the DVD is mis-recognized as a CD, the longest transition region 14T will be treated as 11T, which indicates that a factor 11T/14T should be multiplied to obtain the actual PLL clock frequency by using the above equation.

From the above equations (1) and (2), different types of optical storage media may derive different clock frequencies under the same circumstances that the CD light source is used to access the innermost part of the optical storage media under the same rotation speed 2400 rpm. Accordingly, if a reference frequency may be predetermined between that employed by these two optical storage media, any frequency actually obtained or configured may be compared with the reference frequency (step S208), such that the optical storage medium may be recognized as a DVD (if the actually obtained PLL frequency is larger than the frequency threshold at step S210) or a CD (if the actually obtained PLL frequency is smaller than the frequency threshold at step S212) easily.

Please note that the above parameters are only examples of the present invention, any person having ordinary skills in the art may adjust the parameter values according to specifications or requirements.

Figure 3:
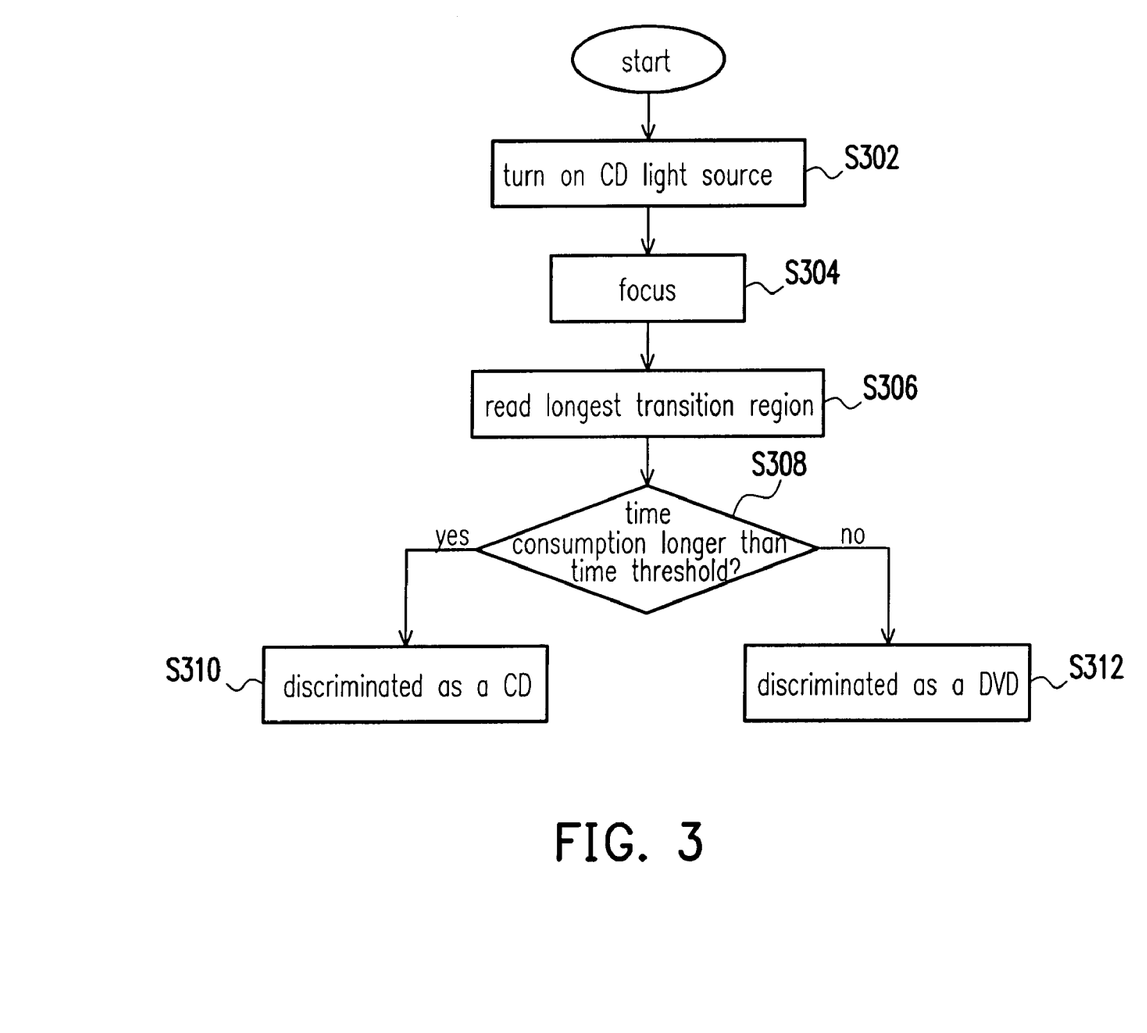
FIG. 3 shows the process flow in the second embodiment of the present invention.

FIG. 3 shows the process flow of the second embodiment according to the present invention. In this embodiment, the steps of turning on the CD light source (step S302), lens focusing (step S304), and reading the longest transition region (step S306) are sequentially performed before accessing data by using the optical pickup head. Since the lengths of the longest transition regions of a CD and DVD are so different (as mentioned above, 3.341 microns and 1.867 microns, respectively), the time-consumption for reading the longest transition region of the CD is longer than that of the DVD when reading the same range under the same rotation speed. Therefore, when a time threshold is set between the times for accessing the DVD and CD (step S308), any optical storage medium may be easily recognized as a CD (step S310) or a DVD (step S312) by comparing the actual time-consumption regarding accessing operation to the longest transition region with the time threshold.

Figure 4:
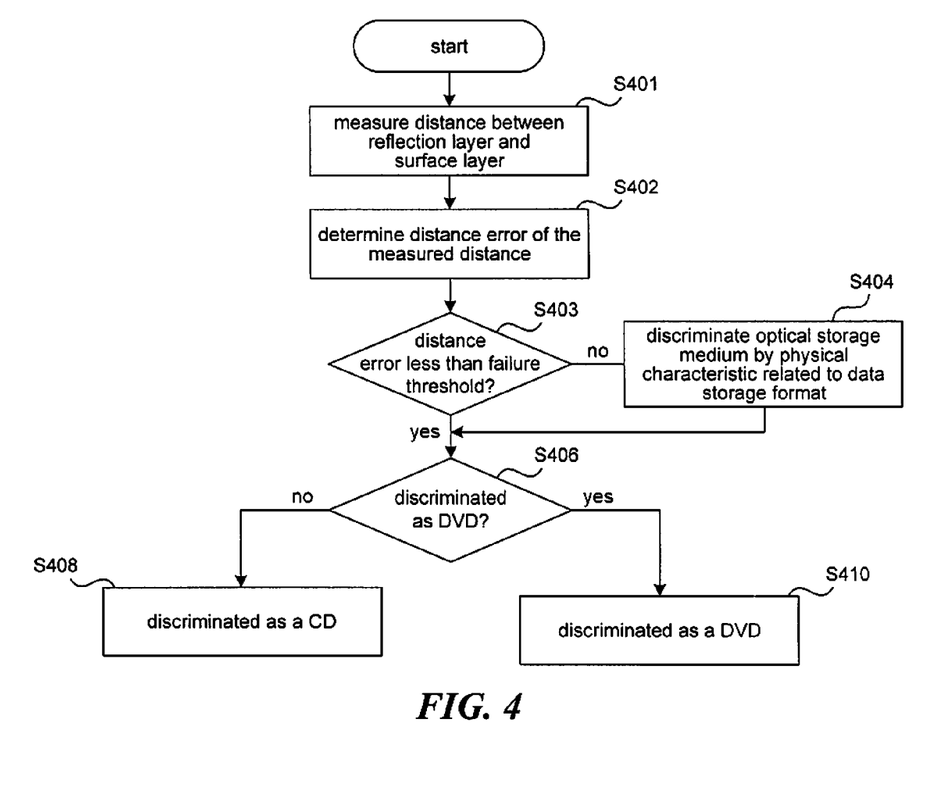
FIG. 4 shows the process flow in the third embodiment of the present invention.

FIG. 4 shows a process flow of the third embodiment of the present invention. In this embodiment, the distance between the reflection and surface layers is used to accelerate the discrimination process (step S402). Generally speaking, the reflection layer of a DVD is substantially at an intermediate position between the upper and lower surface layers of the DVD while the reflection layer of a CD is located underneath the surface layer more distant from the light source. Therefore, recognition procedures for determining what type of the currently loaded optical storage medium may be correctly accomplished by measuring the distance between the reflection and surface layers. However, there still exists a certain degree of measurement errors in the optical storage media since optical disk manufacturers may not seriously follow their specifications. Additionally, since the measurement is based on the velocity of light, the minor distance difference between the reflection and surface layers of CDs and DVDs requires very accurate time-measurement even if CDs and DVDs are manufactured following associated specifications. It is evident that the measurement approach is uncertain because distance error always occurs in every optical disc, which indicates that the type of the loaded optical storage medium may not be recognized correctly when the distance error is larger than a distance threshold.

Therefore, when the distance between the reflection and surface layers of the optical storage medium is accurately measured, based on the distance error (steps S402, S403 "yes", and S406), the optical storage medium can be determined as a CD (e.g. if the distance is larger than a distance threshold, step S408) or a DVD (e.g. if the distance is smaller than a distance threshold, step S410). However, when the distance between the reflection and surface layers of the optical storage medium cannot be accurately measured (i.e. when the distance error larger than a failure threshold), the optical storage medium is discriminated according to physical characteristics related to the data storage formats (e.g. by using the first or second embodiments in FIGS. 2 and 3) (step S404). After obtaining the distance or the physical characteristic, the optical storage medium can be determined as a CD (step S408) or a DVD (step S410).

Additionally, any blank optical storage medium without data recorded thereon may be recognized since its PLL clock frequency remains at zero substantially. Therefore, the operations such as tracking and data accessing that are meaningless to any blank optical disk may be bypassed and ignored. Please note that the decision procedure to the PLL clock frequency may be employed in all embodiments of the present invention to recognize blank optical disks.

The present invention at least offers the advantages as follows. Firstly, the physical characteristics associated with data storage formats are used to discriminate the types of the optical storage media with less time-consumption than before. Secondly, any blank optical disk can be recognized faster than before according to the PLL clock frequency in the disclosed method.

Figure 5:
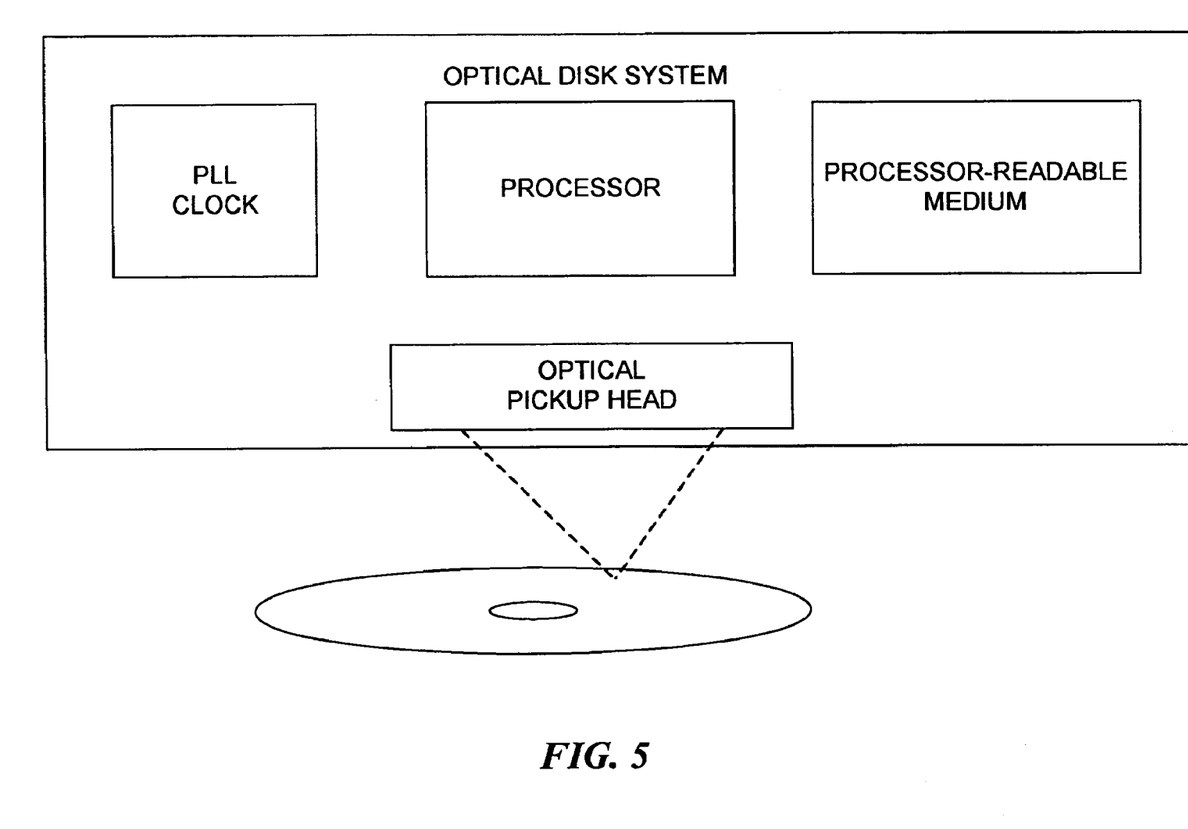
FIG. 5 shows an apparatus in which the process flows of FIGS. 2-4 may be performed.

FIG. 5 shows an apparatus in which the process flows of FIGS. 2-4 may be performed. FIG. 5 shows an optical disk system and an optical storage medium. The optical disk system includes a PLL clock, an optical pickup head, a processor, and a processor-readable medium.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for discriminating a type of an optical storage medium, comprising:
    employing at least an optical pickup to measure a distance between a reflection layer of the optical storage medium and a surface layer of the optical storage medium;
    determining a distance error of the measured distance between the reflection layer of the optical storage medium and the surface layer of the optical storage medium;
    if the distance error is less than a failure threshold, comparing the measured distance with a distance threshold to discriminate a type of the optical storage medium; and
    if the distance error is greater than or equal to the failure threshold, employing an alternate method to discriminate the type of the optical storage medium.

2. The method of claim 1, wherein the optical storage medium is discriminated as a DVD if the measured distance is less than a distance threshold.

3. The method of claim 1, wherein the optical storage medium is discriminated as a CD if the measured distance is greater than a distance threshold.

4. The method of claim 1, wherein the alternate method comprises:
    reading multiple data transition points from a specified range of the optical storage medium; and
    determining a dimension of multiple transition regions in the specified range of the optical storage medium, the transition regions being an interval between neighboring data transition points.

5. The method of claim 4, wherein the data transition points are edges of lands on the optical storage medium.

6. The method of claim 4, wherein the alternate method further comprises:
    obtaining a longest transition region in the multiple transition regions; and
    comparing a dimension of the longest transition region to a transition region threshold to discriminate the type of the optical storage medium.

7. The method of claim 6, wherein the compared dimension is a time consumption of the longest transition region and the transition region threshold is a time threshold.

8. The method of claim 7, wherein the optical storage medium is discriminated as a DVD when the time consumption is less than the time threshold.

9. The method of claim 1, wherein the alternate method comprises:
    accessing synchronous data from a specified range of the optical storage medium;
    configuring a clock frequency of a PLL at a rate based on the accessed synchronous data to enable further data to be read from the optical storage medium; and
    comparing the clock frequency of the PLL with a frequency threshold to discriminate the type of the optical storage medium so that the further data can be read.

10. The method of claim 9, wherein the optical storage medium is discriminated as blank if the clock frequency is substantially zero.

11. An apparatus for discriminating a type of an optical storage medium, comprising:
    an optical disk system, including:
        an optical pickup head configured to receive light reflected from the optical storage medium, and wherein the optical disk system is configured to measure a distance between a reflection layer of the optical storage medium and a surface layer of the optical storage medium, to determine a distance error according to a measurement error associated with the measured distance, to discriminate a type of the optical storage medium according to the measured distance and a distance threshold if the distance error is less than a failure threshold, and to discriminate the type of the optical storage medium without regard to the measured distance and the distance threshold if the distance error is greater than or equal to the failure threshold.

12. The apparatus of claim 11, wherein the optical disk system is further configured to discriminate the optical storage medium as a DVD if the measured distance is less than the distance threshold.

13. The apparatus of claim 11, wherein the optical disk system is further configured to discriminate the optical storage medium as a CD if the measured distance is greater than the distance threshold.

14. The apparatus of claim 11, wherein the optical disk system is further configured to, determine whether the distance error is greater than or equal to the failure threshold, and if so, to read multiple data transition points from a specified range of the optical storage medium and determine a dimension of multiple transition regions in the specified range of the optical storage medium, the transition regions being an interval between neighboring data transition points.

15. The apparatus of claim 14, wherein the data transition points are edges of lands on the optical storage medium.

16. The apparatus of claim 14, wherein the optical disk system is further configured to, determine whether the distance error is greater than or equal to the failure threshold, and if so, to obtain a longest transition region in the multiple transition regions and compare a dimension of the longest transition region to a transition region threshold to discriminate the type of the optical storage medium, wherein the compared dimension is a time consumption of the longest transition region and the transition region threshold is a time threshold.

17. The apparatus of claim 11, further comprising:
a PLL configured to provide a PLL clock frequency according to a rate based on data accessed from a specified range of the optical storage medium, wherein the optical disk system is further configured to, determine whether the distance error is greater than or equal to the failure threshold, and if so, to configure the PLL clock frequency and compare the PLL clock frequency to a frequency threshold to discriminate the type of the optical storage medium.

* * * * *

UNITED STATES PATENT AND TRADEMARK OFFICE
CERTIFICATE OF CORRECTION

PATENT NO.        : 7,843,786 B2
APPLICATION NO.   : 10/693052
DATED             : November 30, 2010
INVENTOR(S)       : Chan It is certified that error appears in the above-identified patent and that said Letters Patent is hereby corrected as shown below:

Title page, under "Assistant Examiner", in Column 2, Line 1, delete "Latanya" and insert -- LaTanya --.

Column 5, line 34, delete "error larger" and insert -- error is larger --.

Signed and Sealed this
Fifth Day of April, 2011

David J. Kappos
*Director of the United States Patent and Trademark Office*